Patented Jan. 16, 1945

2,367,484

UNITED STATES PATENT OFFICE 2,367,484

KETO ESTERS

Albert M. Clifford, Stow, Ohio, assignor to Wingfoot Corporation, Akron, Ohio, a corporation of Delaware No Drawing. Application May 19, 1942, Serial No. 443,645

3 Claims. (Cl. 260—486)

This invention relates to alicyclic keto esters of acids of the acrylic series. These esters may be prepared by the interaction of a metal salt of an acid of the acrylic acid series and a halogen-substituted ketone, a metal halide being split out.

For example, cyclohexanonyl methacrylate may thus be prepared from a sodium acrylate and 2-chloro cyclohexanone in accordance with the following equation:

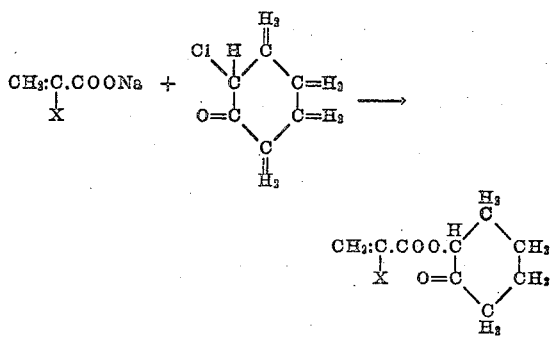

Where X represents hydrogen or an alkyl or halogen radical. The other esters described herein may be similarly prepared.

The acrylates which are reacted with halogen-substituted alicyclic ketones to give the keto esters of this invention are those of the polymerizable acrylic acids. The alpha alkyl substituted acrylic acids yield especially useful esters. Among suitable acids whose alkali metal salts may be mentioned are acrylic acid, methacrylic acid, ethacrylic acid, itaconic acids

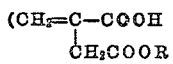

where R is hydrogen or a hydrocarbon substituent), cinnamic acid and alpha phenyl acrylic acid.

The method of preparing the new esters is illustrated by the following examples to which, however, the invention is not limited, the compounds being included within the scope of the invention regardless of the method of preparation.

EXAMPLE 1

Cyclohexanonyl methacrylate

To a solution of 88 parts of NaOH in 800 parts of water was added with cooling and stirring 200 parts of methyl methacrylate containing 2 parts of hydroquinone and 2 parts of N,N'-diphenyl para phenylene diamine. The mixture was refluxed gently for 2½ hours, solution being substantially complete, following which distillation at 35 mm. pressure was conducted until there was collected 191 parts of distillate containing the greater portion of the methanol generated. To one and one-fifth mols of the resulting sodium methacrylate there was added 158 grams 1.2 mols 2-chloro cyclohexanone with stirring over a 30-minute period. The mixture was then heated at a gentle reflux for two hours. After standing overnight the organic layer was separated, dried over $CaSO_4$ and distilled under reduced pressure. The main fraction boiled over a range of 45–60° C. at 5 mm. The distillate, however, polymerized very quickly, even at low temperature (5° C.). In addition to the distillate, a considerable portion remained as a polymerized, non-distillable residue.

EXAMPLE 2

Methyl cyclohexanonyl methacrylate

Sodium methacrylate was condensed with X-chloro-2-methyl cyclohexanone as in Example 1. From 2.65 mols of each reactant was finally obtained a fraction B. P. 52–57° C. at 7 mm. possessing the properties: $n_D^{29}$ 1.4473, $d_{15}^{29}$ 0.9915. Mol. ref. obs. 52.2, calc. 52.25.

Keto esters may similarly be prepared from cyclo pentanone and chloro camphor and other unsubstituted and substituted alicyclic compounds.

These keto esters may be polymerized. The polymerized products are protected in my copending application Serial No. 387,665, filed April 9, 1941, of which this is in part a continuation.

I claim:

1. The cyclohexanonyl and alkyl cyclohexanonyl esters of an acid selected from the group consisting of acrylic acid and alpha alkyl acrylic acids.

2. As a new material methyl cyclohexanonyl methacrylate.

3. Cyclohexanone ester of methacrylic acid.

ALBERT M. CLIFFORD.